(12) United States Patent
Robinson (10) Patent No.: US 11,226,142 B2
(45) Date of Patent: Jan. 18, 2022

(54) HOT WATER AND ENERGY STORAGE

(71) Applicant: ESG POOL VENTILATION LIMITED, St. Ives (GB)

(72) Inventor: Anthony Robinson, St. Ives (GB)

(73) Assignee: ESG POOL VENTILATION LIMITED, St. Ives (GB)

(*) Notice: Subject to any disclaimer, the term of this patent is extended or adjusted under 35 U.S.C. 154(b) by 85 days.

(21) Appl. No.: 16/347,108

(22) PCT Filed: Nov. 2, 2017

(86) PCT No.: PCT/EP2017/078038
§ 371 (c)(1),
(2) Date: May 2, 2019

(87) PCT Pub. No.: WO2018/083166
PCT Pub. Date: May 11, 2018

(65) Prior Publication Data
US 2019/0257558 A1    Aug. 22, 2019

(30) Foreign Application Priority Data
Nov. 3, 2016 (GB) ...................... 1618552

(51) Int. Cl.
*F25B 30/06* (2006.01)
*F24D 19/10* (2006.01)

(52) U.S. Cl.
CPC .......... *F25B 30/06* (2013.01); *F24D 19/1012* (2013.01); *F24D 19/1021* (2013.01);
(Continued)

(58) Field of Classification Search
CPC .............. F25B 30/06; F25B 2600/2507; F24D 19/1012; F24D 19/1021; F24D 2220/0207
See application file for complete search history.

(56) References Cited

U.S. PATENT DOCUMENTS

| | | | | |
|---|---|---|---|---|
| 2,461,449 A | * | 2/1949 | Smith | ..................... F25B 30/06 62/260 |
| 5,119,988 A | | 6/1992 | Fiedrich | |
| 2010/0218933 A1 | | 9/2010 | Deacon et al. | |

FOREIGN PATENT DOCUMENTS

| | | |
|---|---|---|
| CA | 2928295 A1 | 10/2016 |
| CH | 579242 A5 | 8/1976 |

(Continued)

OTHER PUBLICATIONS

JP2010008036A Translation (Year: 2010).*

(Continued)

*Primary Examiner* — Schyler S Sanks
(74) *Attorney, Agent, or Firm* — David W. Carstens; J. Miguel Hernandez; Carstens & Cahoon, LLP (57) ABSTRACT

A hot water energy storage system (100) comprises a storage vessel (102); a pump (151); a heat exchanger (152) arranged to receive water from the storage vessel (102) and to output water to the storage vessel (102); a diverting valve (158) to divert a proportion of the water output from the heat exchanger (152) back to an inlet of the heat exchanger (152), bypassing the storage vessel (102); a temperature sensor (120*a-c*) to measure a temperature of water within the system (100); and a control system (130). The control system (130) controls the pump (151) and the diverting valve (158), based on a temperature measurement of the water and the desired quantity of heat to be transferred by the heat exchanger (152), so as to maintain the return temperature of water entering the storage vessel (102) within a specified range whilst transferring the desired quantity of heat.

16 Claims, 2 Drawing Sheets

(52) U.S. Cl.
CPC ............... *F24D 2220/0207* (2013.01); *F25B 2339/047* (2013.01); *F25B 2600/2507* (2013.01); *F25B 2700/21161* (2013.01); *Y02B 30/70* (2013.01)

(56) References Cited

FOREIGN PATENT DOCUMENTS

| | | | |
|---|---|---|---|
| CN | 203517984 U | 4/2014 | |
| DE | 102011001223 A1 | 9/2012 | |
| EP | 2249098 1 A1 | 11/2010 | |
| GB | 2525856 A | 11/2015 | |
| JP | S604761 A | 1/1985 | |
| JP | H01193537 A | 8/1989 | |
| JP | 2010008036 A * | 1/2010 | ......... F24D 19/1039 |
| JP | 2010008036 A | 1/2010 | |
| JP | 2010065930 A | 3/2010 | |

OTHER PUBLICATIONS

Machine Translation of DE 102011001223A1.
English Translated Abstract of JP 2010008036A.
Machine Translation of CN 203517984.
European Patent Office Search Report dated Mar. 17, 2017 for Corresponding UK Application, No. GB1618552.2.
JP2010065930A_Machine_Translation.
JPH01193537A_English_Abstract.

* cited by examiner

HOT WATER AND ENERGY STORAGE

CROSS REFERENCE TO RELATED APPLICATIONS

This application is a U.S. national phase of International Application No. PCT/EP2017/078038 filed Nov. 2, 2017, which designated the U.S. and claims priority to G.B. application number GB 1618552.2 filed Nov. 3, 2016, the entire content of which is hereby incorporated by reference.

This invention relates to hot water energy storage systems including water storage vessels. More particularly, the invention relates to hot water energy storage systems including water storage vessels which are part of heat pump systems.

A hot water storage vessel has a feed pipe arranged to supply water to the storage vessel and a second pipe through which water is extracted from the storage vessel. A hot water energy storage system has a pump arranged to pump water to and from the storage vessel and a heat exchanger through which at least some of the water passes. The heat exchanger may heat or cool the water depending on system purpose or usage.

The invention may be applied to domestic, commercial or industrial water heating or cooling and/or space heating or cooling. The invention may also be applied to reversible systems which can perform either heating or cooling depending on demand.

Hot water energy storage systems of the invention can therefore be used to take heat from one source and transfer it to another location through electrical and/or mechanical means. Hot water energy storage systems of the invention may be used either to heat or cool, and may be reversible.

With energy prices and concern about energy usage generally increasing, there is a desire to improve the efficiency of all heat transfer systems so as to save both energy and money whilst still meeting heating and/or cooling demands.

In the domestic heating context, hot water from the hot water storage vessel at a first temperature is pumped into radiators, under floor coils, a ventilation unit or the likes to provide heating. The return water is then recirculated back to the storage vessel at a second, lower temperature. The temperature difference would be reversed in a cooling system. In the domestic heating context, a user selects a set, or desired, temperature for the room or other environment to be heated, for example using a thermostat. Air temperature within the environment to be heated is measured, and the heating system is arranged to provide heat until the set temperature is reached, and then to maintain the air temperature at around the set temperature.

Conventional wisdom holds that the water in a hot water storage vessel should be kept as warm as possible.

By contrast, the inventor appreciated that, to achieve optimal efficiency with heat pumps and to maximise the energy storage of the storage vessel, the temperature difference between the top and bottom of the storage vessel should be maximised. The water in the lower portion of the storage vessel should be kept at the lowest reasonably possible temperature (given system requirements and restrictions).

In addition, in most prior art systems, a constant condensing temperature is used throughout heating of the water. For example, if the water is to be heated to 60° C., a condensing temperature of 65° C. may be used throughout the heating process. However, as described in PCT application WO2015/155543, the inventor appreciated that higher efficiency could be achieved by varying the condensing temperature during the heating process; more specifically, by keeping the condensing temperature as low as possible, and increasing the condensing temperature as the temperature of the water to be heated increases. In WO 2015/155543, the condensing temperature is controlled such that it is kept at a determined interval above the temperature of water to be heated (the interval allowing for system heat losses and the likes)—in this way, the condensing temperature is increased at least substantially linearly with water temperature.

The inventor appreciated that, using the method disclosed in his earlier application, WO 2015/155543, heating a smaller amount of colder water could be done more efficiently than heating a larger amount of warmer water, as the average condensing temperature used can be lowered. Lowering the average condensing temperature by only a few degrees provides significant energy savings in accordance with Carnot's law. Further, the inventor appreciated that keeping the water in the lower portion of the storage vessel at the lowest reasonably possible temperature (given system requirements and restrictions), so lowering the condensing temperature required to heat the water in the lower portion of the storage vessel, would enable this type of efficiency saving.

Maximising the temperature difference may therefore offer the advantage of increasing efficiency when the method of the inventor's earlier application is used. However, keeping the temperature in the lower portion of the storage vessel as low as possible whilst still meeting the heating demand is non-trivial. With conventional controls, the return water temperature in a heating system is at a much higher temperature than the optimal value (the water return pipe generally being near the bottom of the storage vessel in a heating scenario). Correspondingly, with conventional controls, the return water temperature in a cooling system is at a much lower temperature than the optimal value (the water return pipe generally being near the top of the storage vessel in a cooling scenario).

This is because the conventional method of controlling the flow of water through the heat exchanger is with a diverting valve which only allows sufficient hot/cold water to enter the heat exchanger to raise/lower the air temperature enough to balance heat losses and maintain the set temperature. The water which has passed through the heat exchanger is recombined with the water diverted around the heat exchanger by the diverting valve before re-entering the storage vessel. The operation of the diverting valve means that the temperature of the return water to the storage vessel is typically only around 5° C. below the temperature of the water leaving the storage vessel, which is say often between 40° C. and 45° C. in a domestic heating context. This means that the return water will steadily return to the storage vessel at that level of temperature, as a large proportion of the circulated water bypasses the heat exchanger and therefore loses very little heat before returning to the storage vessel.

At the end of the day, when night re-heat begins, the average temperature in the lower part of the energy storage vessel will typically be around 42° C., instead of the desired level for maximum system efficiency of around 28° C. This will in turn reduce the coefficient of performance (COP) of the system by over 30%, so decreasing the efficiency.

According to a first aspect of the invention, there is provided a hot water energy storage system comprising:
  a storage vessel;
  a pump arranged, in use, to pump water to and from the storage vessel;

a heat exchanger having an inlet and an outlet and being arranged, in use, to receive water from the storage vessel at the inlet and to output water to the storage vessel via the outlet;

a diverting valve arranged, in use, to divert a proportion of the water output from the heat exchanger back to the inlet of the heat exchanger, bypassing the storage vessel;

one or more temperature sensors arranged, in use, to measure a temperature of water within the system; and a control system, the control system being arranged to control, based on at least one temperature measurement of the water within the system and the desired quantity of heat to be transferred to or from the water by the heat exchanger:

(i) the pump, such that the flow rate of water is regulated; and (ii) the diverting valve, such that the proportion of water which is diverted is regulated, to maintain the return temperature of the water supplied to the storage vessel within a specified range whilst transferring the desired quantity of heat.

The specified range may be a specified value with a tolerance.

As used herein, the term "diverting" is used quite generally to mean directing water away from a path it would otherwise take. In the art, "diverting" water in heat pump systems is often used to describe directing water away from the heat exchanger only, with directing water towards the heat exchanger being referred to as recirculation. The broader definition is used herein, covering both "diversion" and "recirculation".

The storage vessel may be thought of as a buffer vessel. Advantageously, it may improve energy efficiency by allowing more efficient operation of a heating process and/or by allowing heating to be performed when energy is available at a reduced cost (e.g. off-peak/night-time rates) and then storing that energy until it is needed.

Advantageously, the heat exchanger may be arranged to provide space heating.

When the system is to be used for heating, water is removed from the storage vessel at a first temperature and returned to the storage vessel at a second temperature which is lower than the first temperature. In this case, the "specified range" means around the lowest temperature consistent with ensuring that, after allowing for variations in system control processes and/or in the environment of the system, the second temperature is equal to or higher than the temperature to which the system is arranged to be heating the space, room, environment, water or other target to be heated. The skilled person will appreciate that the temperature is therefore maintained at the lowest level for economic heat pump heating.

When the system is to be used for cooling, arrangements are reversed such that water is removed from the storage vessel at a first temperature and returned to the storage vessel at a second temperature which is higher than the first temperature. In this case, the "specified range" means around the highest temperature consistent with ensuring that, after allowing for variations in system control processes and/or in the environment of the system, the second temperature is equal to or lower than the temperature to which the system is arranged to be cooling the space, room, environment, water or other target to be cooled.

The skilled person would understand that the direction of heat transfer (to or from the water within the system) depends on whether the system is being used for heating or cooling, and that the "desired quantity of heat" depends upon the temperature to which the system is arranged to be heating or cooling the space, room, environment, water or other target to be heated or cooled, and the size and heat capacity of that target, amongst other factors.

Equivalently, this may be termed as controlling the pump and diverting valve based on at least one measured temperature and the desired temperature to be reached for an environment, room or other heating/cooling target arranged to be heated/cooled by the system, so as to maintain the return temperature of the water supplied to the storage vessel within a specified range whilst allowing the desired temperature to be maintained, reached or approached, as appropriate.

Controlling both the pump and the diverting valve allows the return temperature to be kept within the specified range whilst still meeting the heating or cooling load, which may vary. If the heating load is very small, for example, only a very small flow of water may be taken from the storage vessel, instead of taking a set flow and diverting most of it around the heat exchanger as is done in the prior art.

Being able to control the return temperature allows destratification within the storage vessel to be reduced. For the example of a heating system with a feed pipe through which water is returned to the storage vessel located at or near the bottom of the storage vessel, the specified range would be around 28° C. (more generally, around the desired temperature for water at the bottom of the storage vessel). Reducing destratification as compared to known systems, i.e. maintaining a larger difference between the temperature of water at the top and bottom of the storage vessel, may allow the system COP to be increased.

Advantageously, the system may reduce destratification of the water. This may result in a higher temperature at the top of the storage vessel for a given average temperature of water therein. This may help to ensure that water at a desired high temperature is available. Additionally, this may mean that a lower temperature is maintained at the bottom of the storage vessel, so improving efficiency when a varying condensing temperature is used for the heating process.

Advantageously, the system may reduce the required storage vessel volume for a given energy demand as compared to prior art systems.

Advantageously, the feed pipe is located at or near the bottom of the storage vessel in embodiments in which the system is used for heating. In this way, cooler water is returned lower down in the vessel, so aligning with the natural temperature stratification of water within the vessel and reducing destratification.

Advantageously, the feed pipe is located at or near the top of the storage vessel in embodiments in which the system is used for cooling. In this way, hotter water is returned higher up in the vessel, so aligning with the natural temperature stratification of water within the vessel and reducing destratification.

In embodiments in which the system is reversible, the pump direction may be reversible such that, for a storage vessel having one pipe at or near the top and one pipe at or near the bottom, which pipe is the feed pipe can be selected based on system usage. Alternatively or additionally, two pumps may be provided—one arranged to pump fluid in a clockwise direction and the other to pump fluid in an anticlockwise direction around the system. When heating, one pump may be active and the other left open such that the water can flow through it freely. When cooling, this arrangement may be reversed such that the previously-open pump is active and the previously-active pump is open.

Advantageously, the diverting valve may be arranged such that the diverted water is combined with the water newly taken from the storage vessel before entering the pump. In this way, even if only a tiny amount of water newly taken from the storage vessel is needed to meet heating requirements, the pump maintains a significant throughput. This is advantageous as many pumps have a minimum flow rate setting, and turning a pump on and off can waste energy.

In some embodiments, a second diverting valve may be beneficial in cases where the pump has a non-zero minimum throughput. Such systems may have a second diverting valve arranged, in use, to direct a proportion of the water from the pump outlet straight back to the pump inlet, without passing through the heat exchanger or re-entering the storage vessel, when the minimum pump throughput would otherwise be at, below or near its minimum throughput.

Advantageously, this may remove the need to switch the pump on and off, which is likely to reduce system efficiency.

In cases with a second diverting valve, the control system may be arranged, in use, to control the second diverting valve based on at least one of the temperature of the water entering the heat exchanger, the flow rate of water through the pump, and the desired quantity of heat to be transferred.

Advantageously, this may facilitate a set temperature being reached or maintained without switching the pump on and off, and whilst minimising or reducing destratification within the storage vessel as compared to prior art systems.

According to a second aspect of the invention, there is provided a control system for a hot water energy storage system having a storage vessel, a heat exchanger having an inlet and an outlet, a pump, at least one temperature sensor arranged, in use, to measure a temperature of water within the hot water energy storage system, and a diverting valve arranged, in use, to divert a proportion of the water output from the heat exchanger back to the inlet of the heat exchanger;
 the control system being arranged to:
  control, based on at least one temperature measurement of the water within the system and the desired quantity of heat to be transferred to or from the water by the heat exchanger:
   (i) the pump, such that the flow rate of water is regulated; and
   (ii) the diverting valve, such that the proportion of water which is diverted is regulated,
  to maintain the return temperature of the water supplied to the storage vessel within a specified range whilst transferring the desired quantity of heat.

The control system may comprise wired and/or wireless communications with the temperature sensor(s), the pump and the diverting valve. One or more flow rate sensors may also be integrated into the system.

According to a third aspect of the invention, there is provided a method of controlling a hot water energy storage system having a storage vessel, a heat exchanger having an inlet and an outlet, a pump, at least one temperature sensor arranged, in use, to measure a temperature of water within the hot water energy storage system, and a diverting valve, the method comprising:
 pumping water from the storage vessel to the inlet of the heat exchanger;
 diverting, using the diverting valve, a proportion of the water from the outlet of the heat exchanger back to the inlet of the heat exchanger; and
 returning any water which is not diverted from the outlet of the heat exchanger back to the storage vessel,
 the method further comprising controlling, based on at least one temperature measurement of the water within the system and the desired quantity of heat to be transferred to or from the water by the heat exchanger:
  (i) the pump, such that the flow rate of water entering the heat exchanger is regulated; and
  (ii) the diverting valve such that the proportion of water which is diverted back to the inlet of the heat exchanger is regulated,
 to maintain the return temperature of the water supplied to the feed pipe of the storage vessel within a specified range whilst transferring the desired quantity of heat.

According to a fourth aspect of the invention, there is provided a computer-readable medium containing instructions which, when read by a processor, cause that processor to implement the method of the third aspect of the invention.

Features described in relation to one of the above aspects of the invention may be applied, mutatis mutandis, to the other aspect of the invention. Further, the features described may be applied to the or each aspect in any combination.

There now follows by way of example only a detailed description of embodiments of the present invention with reference to the accompanying drawings in which.

Figure 1:
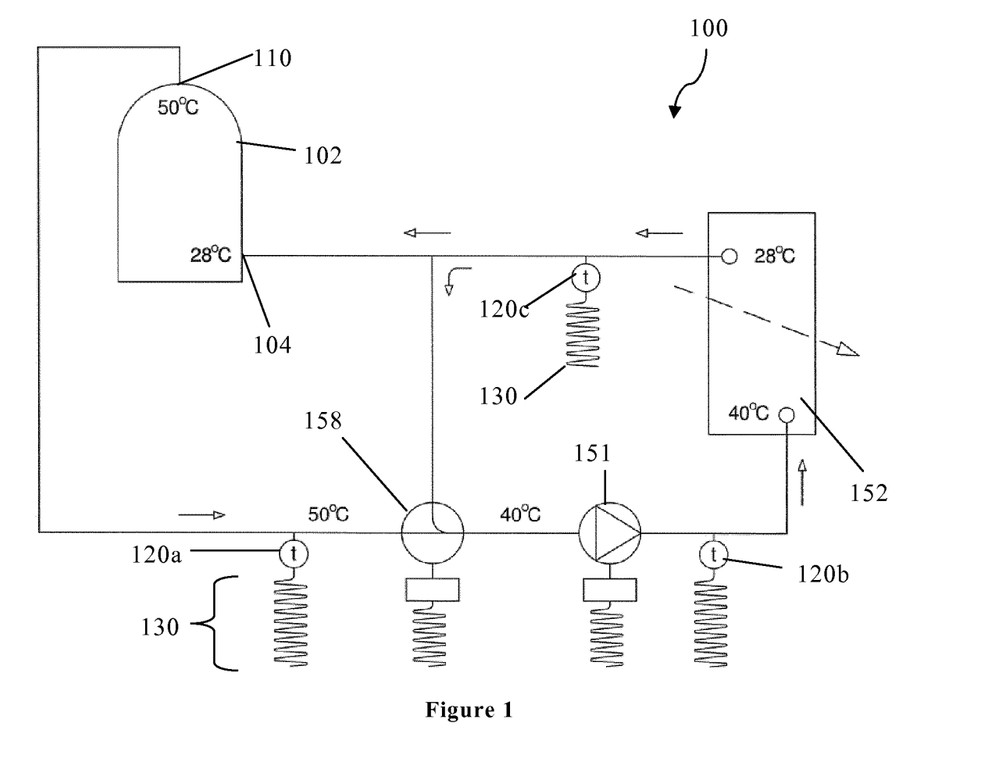
FIG. 1 shows a schematic view of a heating or cooling system of an embodiment of the invention.

In the example implementation described with respect to FIG. 1, a diverting valve is arranged to allow water to recirculate through a heat exchanger, bypassing a storage vessel.

FIG. 1 shows a hot water energy storage system 100. The system 100 includes a storage vessel 102, which may be described as a buffer.

When used for heating, the storage vessel 102 is provided with energy in the form of the direct introduction of hot water, a water heater such as an immersion heater, or a heat exchanger. The skilled person would appreciate that the present invention may have particular utility in which the water in the storage vessel 102 is heated using a non-constant condensing temperature, and in particular a condensing temperature which increases with the water temperature such that the lowest possible condensing temperature is used throughout the heating process, as described in the inventor's previous application, WO 2015/155543.

When used for cooling, the storage vessel 102 is provided with a means of removing energy in the form of the direct introduction of cold water or a heat exchanger. The skilled person would appreciate that the present invention may have particular utility in which the water in the storage vessel 102 is cooled using a non-constant evaporating temperature, and in particular an evaporating temperature which decreases with the water temperature such that the highest possible evaporating temperature is used throughout the cooling process, as described in the inventor's previous application, WO 2015/155543.

The efficiency of the heating (or cooling) of the water within the storage vessel 102 can therefore be significantly increased in a heating (or cooling) system embodying the present invention.

The storage vessel 102 has a feed pipe 104 through which water enters the storage vessel and an outlet pipe 110 through which water leaves the storage vessel.

In the embodiment shown, the system 100 is arranged to provide heating; the feed pipe 104 is the pipe located near the bottom of the storage vessel 102, and the outlet pipe 110 is the pipe located near the top of the storage vessel 102, such that warmer water is drawn off.

The feed pipe 104 is located in a lower region of the storage vessel 102 and is intended to carry relatively cool water (often at around 28° C.) into the storage vessel 102. The outlet pipe 110 is located in an upper region of the storage vessel and is intended to carry relatively warm water (often at around 50-60° C.) out of the storage vessel 102. Introducing cooler water at the bottom helps to reduce destratification. Warmer water naturally accumulates at the top of the storage vessel 102, hence the outlet pipe 110 is arranged to take off hot water from the upper portion.

If or when the system 100 is arranged to provide cooling, the inlet 104 and outlet 110 positions are reversed and cooler water is taken out and hotter water returned. For ease, the system 100 is described below with reference to providing heating. The skilled person would understand that the same principles would apply if the system 100 were used for cooling, with the direction of fluid and heat flow (as marked by the arrows in FIG. 1) simply being reversed.

Similarly, the system of FIG. 1 is described with respect to space or room heating, but the skilled person would understand that other forms of heating could be achieved with the same system. For example, heating (or cooling) water or a refrigerant fluid. Further, an alternative or additional liquid could be used within the system 100 in place of water or mixed with the water, for example a refrigerant, an anti-corrosion agent and/or an anti-bacterial agent.

In the embodiment shown, the heat exchanger 152 is an air handling unit heater, arranged to heat a room. In alternative or additional embodiments, the heat exchanger 152 may be of a different type and/or may be arranged to heat a different target. For example, the heat exchanger 152 may be part of a different air-handling unit, a radiator heating system or another space heating system.

The system 100 has a pump 151, a heat exchanger 152 and a control system.

The pump 151 takes water from the storage vessel 102 via the outlet pipe 110 and pumps it to the inlet of the heat exchanger 152. In the embodiment shown, the pump 151 is located between the outlet pipe 110 from the storage vessel 102 and the inlet of the heat exchanger 152. In alternative embodiments, the pump 151 may be placed elsewhere in the heat exchange circuit, and/or multiple pumps may be provided. The pump 151 is capable of pumping water at different flow rates and can be controlled to adjust the flow rate. The pump 151 is controlled using a variable speed drive (inverter) in the example shown.

The heat exchanger 152 uses hot water from the storage vessel 102 to heat the surrounding air, and cooler water is returned to the storage vessel 102. The heat exchanger 152 may simply be one or more radiators (i.e. convection heaters) in this example. In alternative examples, the heat exchanger 152 may use hot water from the storage vessel 102 to heat a second medium, e.g. water or a refrigerant.

The system also has a diverting valve 158. The diverting valve 158 is arranged to direct a portion of the water leaving the heat exchanger 152 back to the inlet of the heat exchanger. In this way, a portion of the water from the storage vessel 102 is recirculated through the heat exchanger 152 one or more times before being returned to the storage vessel.

In limiting cases, the proportion of water diverted may be as low as 0% or as high as 100% of the total water flow.

The system components are connected by pipes. Pipes connect the outlet pipe 110 of the storage vessel 102 to the inlet of the heat exchanger 152 and the outlet of the heat exchanger to the feed pipe 104 of the storage vessel. An additional pipe is provided between the diverting valve 158, which is on the pipe between the outlet of the heat exchanger and the feed pipe 104 of the storage vessel, and the pipe between the outlet pipe 110 of the storage vessel 102 and the inlet of the heat exchanger 152.

The diverting valve 158 is motorised. The diverting valve 158 controls what proportion of the water leaving the heat exchanger 152 returns to the inlet of the heat exchanger, and what proportion returns directly to the storage vessel 102. The water which is directed back to the inlet of the heat exchanger 152 is combined with water newly taken from the storage vessel 102 before re-entering the heat exchanger 152. Motorisation of the diverting valve 158 allows the proportions to be adjusted automatically by the control system.

The control system comprises connections 130 between one or more temperature sensors 120a-c, the motorised diverting valve 158 and the variable-speed pump 151 and one or more processors. The one or more processors are arranged to control the pump 152 and the diverting valve 158 so as to regulate the heating/cooling output and the return temperature. The processor therefore controls one or more feedback loops, changing the action of the diverting valve 158 and/or the pump 151 in response to temperature data and the desired heating/cooling load and return water temperature.

One or more flow rate sensors may also be used in some embodiments, and their readings input to the processors.

The curved lines 130 represent connections to a digital controller (not shown), as distinct from straight lines representing pipes. The connections may be wired or wireless, e.g. WiFi or Bluetooth®. The connections and digital controller are one example of a control system for use with the energy storage system shown.

Advantageously, the recirculated water is combined with the water newly taken from the storage vessel 102 before entering the pump 151. In this way, even if only a tiny amount of water newly taken from the storage vessel 102 is needed to meet heating requirements, the pump 151 maintains a significant throughput. This is advantageous as many pumps have a minimum flow rate setting, and turning a pump on and off can waste energy. In an extreme case, 100% of the water leaving the heat exchanger 152 may be returned to the inlet to the heat exchanger, and no water may be returned to the storage vessel 102.

The system 100 comprises at least one temperature sensor 120a, 120b, 120c. The or each temperature sensor 120a, 120b, 120c is arranged to measure the temperature of water within the system 100 at a specified point. In the embodiment shown, three temperature sensors are provided.

The first temperature sensor 120a is arranged between the outlet from the storage vessel 102 and the point where recirculated water is combined with water newly taken from the storage vessel. The first temperature sensor 120a provides a measurement of the temperature of the water extracted from the storage vessel 102 (with possible heat exchange losses along the pipe).

The second temperature sensor 120b is arranged between point where recirculated water is combined with water newly taken from the storage vessel 102 and the heat exchanger 152. The second temperature sensor 120b provides a measurement of the temperature of the water entering the heat exchanger (with possible heat exchange losses along the pipe).

The third temperature sensor 120c is arranged between the outlet from the heat exchanger 152 and the feed pipe 104 which returns water to the storage vessel 102. The third temperature sensor 120c provides a measurement of the temperature of the water returning to the storage vessel 102 (with possible heat exchange losses along the pipe).

More or fewer temperature sensors may be provided in other embodiments, and/or the position of each temperature sensor may be changed.

In all cases, heat exchange losses along pipes may be calculated if information on pipe dimensions, materials, insulation and the likes, and a measure of outside temperature, are provided. Similarly, for a given heat exchanger, temperature of the medium or space to be heated, flow rate through the heat exchanger, and water temperature at the inlet to the heat exchanger, the temperature of water output from the heat exchanger may be calculated.

A temperature measurement taken at one point in the system 100 may therefore be used to calculate a temperature at another position, as illustrated by the examples provided above.

The skilled person would understand that, with a sufficiently detailed knowledge of the system 100 (including component properties, flow rates and heat losses/gains) and of the external temperature, the water temperature at any point in the system 100 can be calculated from the water temperature at any other point (excluding points within the storage vessel 102 which are not at or near the outlet or inlet, as convection and turbulence effects may make such calculations intractable in a reasonable timeframe, if soluble at all, with currently available data and computing power). A single temperature sensor 120 may therefore alternatively be placed at any point around the system 100.

The control system is arranged to control the flow rate through the pump 151 and the proportion of water recirculated through the heat exchanger 152 in response to the temperature measurements.

A temperature sensor 120a-c senses a temperature of the water within the system 100. The control system adjusts the pump 151 flow rate and/or the proportion of water diverted by the diverting valve 158 in response to the measured temperature.

If the return water temperature deviates significantly above the desired/optimum temperature:
  i. the pump 151 is slowed so as to reduce the flow rate. At a reduced flow rate, more heat is lost from each unit of water passing through the heat exchanger 152, as its dwell time is longer within the heat exchanger (down to a minimum flow rate at which temperatures on the two sides of the heat exchanger equilibrate; in reality this is unlikely to occur in most domestic or commercial heating systems); and/or
  ii. the diverting valve 158 is adjusted to increase the amount of water recirculated through the heat exchanger 152 such that more heat can be lost from the water.

If the pump rate is slowed without changing the proportion of water recirculated, less hot water is taken from the storage vessel 102.

If the return water temperature deviates significantly below the desired/optimum temperature:
  i. the pump 151 is sped up so as to increase the flow rate. At an increased flow rate, less heat is lost from each unit of water passing through the heat exchanger 152, as its dwell time is shorter within the heat exchanger; and/or
  ii. the diverting valve 158 is adjusted to reduce the amount of water recirculated through the heat exchanger 152 such that less heat is lost from the water.

If the pump rate is increased without changing the proportion of water recirculated, more hot water is taken from the storage vessel 102.

In either case, the balance between options (i) and (ii) is selected to enable the desired/optimum temperature of the target to be heated to be reached or maintained. The two-variable control allows both return temperature and amount of heat transferred to be controlled. By contrast, prior art systems with a single diverting valve could only be used to control return temperature if a corresponding effect on heat transferred was accepted.

In addition to the temperature sensor 120a, 120b, 120c measuring a temperature within the system, a measurement of the temperature of the environment or other target to be heated is also used to control the diverting valve 158 and/or pump 151. A temperature reading from a sensor within the environment is provided to the system 100. Alternatively, a further temperature sensor measuring the temperature of the environment or other target to be heated may be provided as part of the system 100 (not shown in FIG. 1). The skilled person would therefor understand that the additional temperature sensor itself may be part of the system 100 or provided separately but in communication with the system 100.

The additional temperature sensor (not shown) senses the temperature within the environment to be heated—e.g. a space temperature sensor. Comparing this measured temperature to the set temperature requested by a user determines whether more or less heating is needed (the desired amount of heat to be transferred from the water within the system 100 to the air in the environment to be heated can therefore be calculated, in this example).

The control system allows the diverting valve 158 and the speed of the pump 151 to be adjusted as appropriate. The diverting valve 158 recirculates a smaller proportion of the water through the heat exchanger 152 when the heating load is larger, as it is advantageous to have more of the hotter water newly extracted from the storage vessel 102 in this case. In cases where the measured temperature is at or higher than the set value, all or substantially all of the water may be recirculated through the heat exchanger 152, and less water, if any, may be newly taken from the storage vessel 102.

Embodiments of the invention used for heating aim to keep the temperature of the return water as low as possible, given system constraints and ambient temperature, so as to avoid destratification of the water within the storage vessel 102, and/or to improve heat pump operation for heating. In some cases, a lower bound may be set so as to avoid freezing, and/or to avoid temperatures which could be deleterious to system components.

Embodiments of the invention used for cooling aim to keep the temperature of the return water as high as possible, given system constraints and ambient temperature, so as to avoid destratification of the water within the storage vessel 102. In some cases, an upper bound may be set so as to avoid water boiling in the pipes, and/or to avoid temperatures which could be dangerous in the case of a leak and/or deleterious to system components.

Keeping the return temperature as low as possible (heating system) or as high as possible (cooling system) may be described as keeping the water temperature within a specified range. The specified range will vary depending on one or more of the following non-limiting list of factors:
(i) system use (e.g. heating or cooling);
(ii) ambient temperature/temperature of the surrounding environment;
(iii) the desired temperature to be reached in the heating/cooling target;
(iv) system configuration;
(v) set tolerances; and/or
(vi) system insulation.

The specified range may be set by a user or set automatically by the control system based upon the set, desired, temperature and the measured space temperature.

The temperatures shown in FIG. 1 are provided by way of example only. In this example, water near the bottom of the vessel 102 is kept at around 28° C. and water near the top of the vessel at around 50° C. Temperature sensor 120a measures the temperature of water leaving the top of the vessel 102, so measures a temperature at or near 50° C. assuming minimal heat losses from the pipes. Temperature sensor 102b measures the temperature of the water entering the heat exchanger 152. In this example, the temperature measured by sensor 120b is around 40° C., as the hotter water from the vessel 102 has been mixed with some cooler water from the outlet of the heat exchanger 152. The third temperature sensor 120c measures the temperature of water leaving the heat exchanger, which is controlled to be around 28° C. in this example, so as to maintain the water temperature in the lower region of the storage vessel 102.

In at least some embodiments, the feed pipe 104 and/or the outlet pipe 110 has a pipe portion extending within the storage vessel 102. The pipe portion within the vessel may have perforations, and may therefore be described as a perforated pipe.

Having a plurality of relatively small holes (perforations) in the perforated portion results in the water entering the storage vessel being distributed instead of forming a single jet. The angle of the holes with respect to the feed pipe aligns with convection currents within a water storage vessel 102 such that hotter water is directed towards the top of the storage vessel and colder water is directed towards the bottom of the storage vessel. These features reduce destratification of the water within the storage vessel, so allowing the water temperature in the lower portion of the storage vessel to be kept low relative to the temperature in the upper portion.

The end of the feed pipe 104 within the storage vessel 102 may be open or closed. In embodiments in which the end of the pipe is closed, the total area of the plurality of holes is preferably greater than the cross-sectional area of the pipe. In embodiments in which the end of the pipe is open, the holes provide additional routes for water to leave the pipe, and the total area of the plurality of holes may or may not be greater than the cross-sectional area of the pipe.

Advantageously, in either case, the velocity at which the return water enters the storage vessel 102 is therefore reduced as compared to prior art feed pipes, so disturbing water within the storage vessel less and further reducing destratification.

The hot water energy storage vessel may additionally have an outlet pipe arranged in use, to carry water away from the storage vessel; the outlet pipe having a perforated portion which extends into the storage vessel, the perforated portion having a plurality of holes of area less than one quarter of the cross-sectional area of the pipe.

Advantageously, the perforated portion allows water to be drawn off at a variety of locations instead of all through a single pipe entrance, so reducing disruption to convection currents within the storage vessel.

As for the feed pipe 104, the end of the outlet pipe 110 within the storage vessel may be open or closed. In embodiments in which the end of the pipe is closed, the total area of the plurality of holes is preferably greater than the cross-sectional area of the pipe. In embodiments in which the end of the pipe is open, the holes provide additional routes for water to enter the pipe, and the total area of the plurality of holes may or may not be greater than the cross-sectional area of the pipe.

Advantageously, in either case, the velocity at which the water enters the outlet pipe from the storage vessel is therefore reduced as compared to prior art outlet pipes, so disturbing water within the storage vessel less and further reducing destratification.

Non-limiting examples of perforated pipes 304a, 304b, 304c, 304d (collectively referred to as 304) are suitable for use with storage vessels 102 of embodiments of the invention are shown in FIGS. 2A to 2D.

Each perforated pipe 304 has an open end (not shown) outside of the storage vessel 102 which connects the pipe to a heat exchange circuit and a second end 306 within the storage vessel 102. The perforated pipe 304 has no perforations (i.e. no holes in the pipe wall) outside of the storage vessel 102, and may be thought of as a pipe with a perforated portion 304. The length and shape of the non-perforated portion will vary depending on system configuration, as would be understood by the skilled person.

The terms "hole" and "perforation" are used interchangeably herein. It will be appreciated that the holes (perforations) may not be made by perforation of the pipe wall. For example, a pipe may be made (e.g. by moulding or casting) with the holes in place instead of being pierced after fabrication. The term "perforated pipe" is therefore intended to cover any pipe with a plurality of holes in its walls, whether or not these holes were made by perforation of an initially-unperforated pipe wall.

In the embodiment being described, the perforated pipe 304 is a single component. In alternative or additional embodiments, the perforated pipe 304 comprises two or more connected pipe portions.

In the embodiments being described, the perforated pipe 304 is at least substantially cylindrical. The skilled person would understand that other pipe shapes can be used; for example cuboid pipe sections.

Figure 2A:
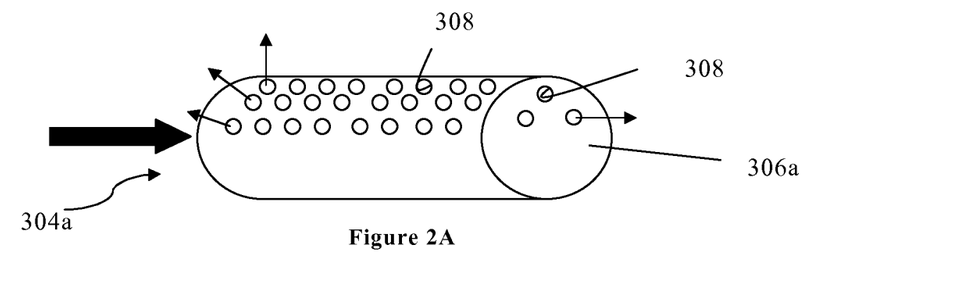
FIGS. 2A to 2D show four alternative perforated pipe designs suitable for use in embodiments of the invention.
Figure 2B:
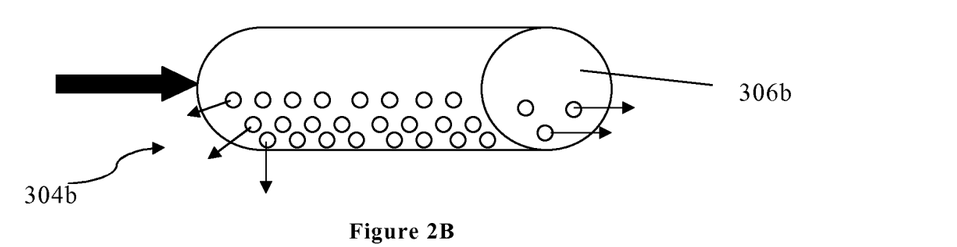

In embodiments such as that shown in FIGS. 2A and 2B, the second end 306a,b of the perforated pipe 304a,b is closed, but has holes 308 such that a portion of the cross-sectional area of the pipe 304a,b is open to the storage vessel 102.

Figure 2C:
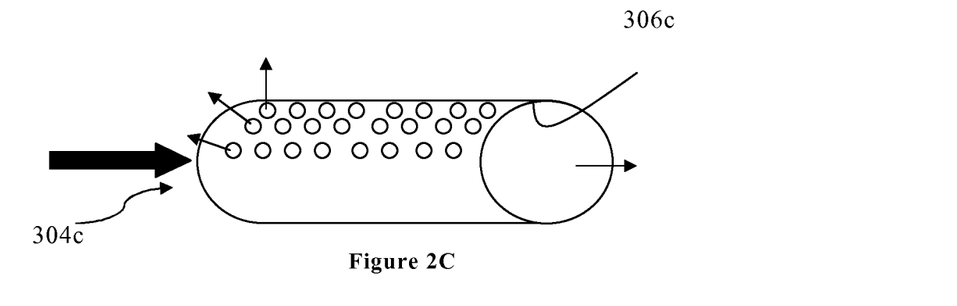

In embodiments such as that shown in FIG. 2C, the second end 306c of the perforated pipe 304c is open, such that the entire cross-sectional area of the pipe 304c is open to the storage vessel 102.

Figure 2D:
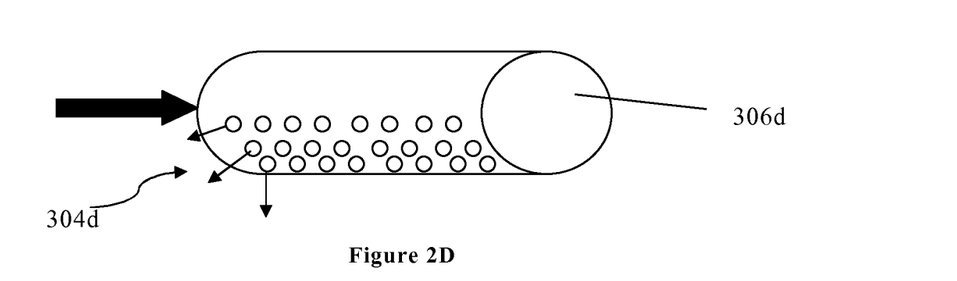

In embodiments such as that shown in FIG. 2D, the second end 306d of the perforated pipe 304d is closed and has no perforations, such that the entire cross-sectional area of the pipe 304d is closed and water cannot pass through it.

In the embodiments shown, the perforations 308 are all at least substantially circular. Advantageously, circular perforations have no corners, which can be weak points for crack formation. The skilled person would understand that alternative perforation shapes can be used, for example ovals, squares, triangles, or any other regular or irregular shape. Additionally or alternatively, shape may vary between perforations on the same pipe.

In the embodiments shown, the perforations 308 are all at least substantially the same size. In additional or alternative embodiments, sizes may vary between perforations 308 on the same pipe.

In the embodiments shown, the perforations 308 are arranged in substantially straight lines along the pipe 304. In alternative embodiments, the perforations 308 may be in any other configuration, for example in a single straight line, in a single curved line, in blocks or randomly distributed within the perforated portion.

Flow into the pipes 304 is marked by the thick black arrow in FIGS. 2A to 2D. Examples of flow out of the pipes 304 are marked by the thin black arrows in FIGS. 2A to 2D. It will be appreciated that, in most embodiments, water will flow out of most or all of the holes 308.

In the examples shown in FIGS. 2A and 2C, the perforations 308 are angled either horizontally or upwardly with respect to the pipe 304a,c. Advantageously, feed pipes 304 with perforations 308 angled in this way are used in embodiments of the invention in which water entering the storage vessel 102 is warmer than the average temperature of water within the storage vessel 102. Directing the warmer water upwards may help to align flow with convection currents within the storage vessel 102. In alternative such embodiments, all perforations 308 may be angled upwards, with none being horizontal.

In the examples shown in FIGS. 2B and 2D, the perforations 308 are angled either horizontally or downwardly with respect to the pipe 304b,d. Advantageously, pipes 304 with perforations 308 angled in this way are used in embodiments of the invention in which water entering the storage vessel 102 is cooler than the average temperature of water within the storage vessel 102. Directing the cooler water downwards may help to align flow with convection currents within the storage vessel 102. In alternative such embodiments, all perforations 308 may be angled downwards, with none being horizontal.

In the embodiments being described, the perforations 308 are small compared to the cross-sectional area of the pipe 304. Advantageously, introducing water to the storage vessels in a plurality of smaller, distributed jets (one jet per perforation) as opposed to in a single jet (through an open end of a prior art pipe) further reduces disruption to convection currents within the storage vessel 102. Here, "small" means having an area no more than one quarter of the cross-sectional area of the pipe 304. Preferably, the perforations 308 have a diameter (or longest dimension, in the case of non-circular perforations) of no greater than one fifth, or more preferably one tenth of the pipe diameter (or longest cross-sectional dimension, in the case of pipes with a non-circular cross-section).

In at least some of the embodiments being described, the total hole area (total perforation 308 area, plus the open cross-sectional area of the pipe 306c where applicable) is greater than the total cross-sectional area of the pipe. Advantageously, the increased area means that the velocity of water leaving the pipe 304 into the storage vessel 102 is lower than that of water entering the pipe 304 from the remainder of the heat exchange system 100.

The skilled person would appreciate that the orientation of perforations on the outlet pipe 110 is likely to have a smaller effect on convection currents that that for perforations on the feed pipe 104 in most embodiments. This is because when a fluid is expelled from a hole, it forms a jet separated from the surrounding fluid by a thin layer of turbulent fluid. By contrast, when the same fluid is sucked into a hole of the same size at the same rate, the fluid enters the hole from all directions, forming a sink-like flow. By way of metaphor, blowing out a candle is easy, as the breath creates a directed jet, whereas sucking out a candle is not.

In other examples, such as the embodiment shown, the perforations 308 may be upward-facing in both the feed pipe 304 and the outlet pipe 310. Cooler water, which is naturally sinking with the convection current, may therefore enter the outlet pipe 310 as it sinks. The warmer water entering the storage vessel 102 via the feed pipe 304 may be directed upwards.

The invention claimed is:

1. A hot water energy storage system comprising:
   a storage vessel;
   a pump arranged, in use, to pump water to and from the storage vessel;
   a heat exchanger having an inlet and an outlet and being arranged, in use, to receive water from the storage vessel at the inlet and to output water to the storage vessel via the outlet;
   a diverting valve arranged, in use, to divert a proportion of the water output from the heat exchanger back to the inlet of the heat exchanger, bypassing the storage vessel;
   one or more temperature sensors arranged, in use, to measure a temperature of water within the system; and
   a control system,
      the control system being arranged to control, based on at least one temperature measurement of the water within the system and the desired quantity of heat to be transferred to or from the water by the heat exchanger:
         (i) the pump, such that the flow rate of water is regulated; and
         (ii) the diverting valve, such that the proportion of water which is diverted is regulated,
      to maintain the return temperature of the water supplied to the storage vessel within a specified range whilst transferring the desired quantity of heat, and wherein the system is arranged to be used for heating, and the specified range means the lowest temperature consistent with ensuring that the return temperature is equal to or higher than the maximum temperature to which the system is arranged to be heating a space, room, environment, water or other target to be heated.

2. The hot water energy storage system according to claim 1, in which water is returned to the storage vessel via a feed pipe, and the feed pipe is located at or near the bottom of the storage vessel.

3. The hot water energy storage system according to claim 1 in which the system is reversible such that the system can operate as a heating system or as a cooling system.

4. The hot water energy storage system according to claim 3 in which the direction in which water is pumped is reversed to allow the system to be reversed.

5. The hot water energy storage system according to claim 1 in which the diverting valve is arranged such that the diverted water is combined with the water newly taken from the storage vessel before entering the pump.

6. The hot water energy storage system according to claim 1 having a second diverting valve arranged, in use, to direct a proportion of the water from the pump outlet back to the pump inlet, without passing through the heat exchanger or re-entering the storage vessel.

7. A control system for a hot water energy storage system having a storage vessel, a heat exchanger having an inlet and an outlet, a pump, at least one temperature sensor arranged, in use, to measure a temperature of water within the hot water energy storage system, and a diverting valve arranged, in use, to divert a proportion of the water output from the heat exchanger back to the inlet of the heat exchanger, bypassing the storage vessel;

the control system being arranged to:
control, based on at least one temperature measurement of the water within the system and the desired quantity of heat to be transferred to or from the water by the heat exchanger:
(i) the pump, such that the flow rate of water is regulated; and
(ii) the diverting valve, such that the proportion of water which is diverted is regulated,
to maintain the return temperature of the water supplied to the storage vessel within a specified range whilst transferring the desired quantity of heat, and wherein the system is arranged to be used for heating, and the specified range means the lowest temperature consistent with ensuring that the return temperature is equal to or higher than the maximum temperature to which the system is arranged to be heating a space, room, environment, water or other target to be heated.

8. The control system according to claim 7, in which the control system is arranged to control a second diverting valve so that a proportion of the water from the pump outlet is directed back to the pump inlet.

9. A method of controlling a hot water energy storage system having a storage vessel, a heat exchanger having an inlet and an outlet, a pump, at least one temperature sensor arranged, in use, to measure a temperature of water within the hot water energy storage system, and a diverting valve, the method comprising:
pumping water from the storage vessel to the inlet of the heat exchanger;
diverting, using the diverting valve, a proportion of the water from the outlet of the heat exchanger back to the inlet of the heat exchanger, bypassing the storage vessel; and
returning the water which is not diverted from the outlet of the heat exchanger back to the storage vessel,
the method further comprising controlling, based on at least one temperature measurement of the water within the system and the desired quantity of heat to be transferred to or from the water by the heat exchanger:
(i) the pump, such that the flow rate of water entering the heat exchanger is regulated; and
(ii) the diverting valve such that the proportion of water which is diverted back to the inlet of the heat exchanger is regulated,
to maintain the return temperature of the water supplied to the feed pipe of the storage vessel within a specified range whilst transferring the desired quantity of heat, and wherein the system is arranged to be used for heating, and the specified range means the lowest temperature consistent with ensuring that the return temperature is equal to or higher than the maximum temperature to which the system is arranged to be heating a space, room, environment, water or other target to be heated.

10. A non-transitory computer-readable medium containing instructions which, when read by a processor, cause that processor to implement the method of claim 9.

11. A hot water energy storage system comprising:
a storage vessel;
a pump arranged, in use, to pump water to and from the storage vessel;
a heat exchanger having an inlet and an outlet and being arranged, in use, to receive water from the storage vessel at the inlet and to output water to the storage vessel via the outlet;
a diverting valve arranged, in use, to divert a proportion of the water output from the heat exchanger back to the inlet of the heat exchanger, bypassing the storage vessel;
one or more temperature sensors arranged, in use, to measure a temperature of water within the system; and
a control system,
the control system being arranged to control, based on at least one temperature measurement of the water within the system and the desired quantity of heat to be transferred to or from the water by the heat exchanger:
(i) the pump, such that the flow rate of water is regulated; and
(ii) the diverting valve, such that the proportion of water which is diverted is regulated,
to maintain the return temperature of the water supplied to the storage vessel within a specified range whilst transferring the desired quantity of heat, and wherein the system is arranged to be used for cooling, and the specified range means the highest temperature consistent with ensuring that the return temperature is equal to or lower than the minimum temperature to which the system is arranged to be cooling a space, room, environment, water or other target to be cooled.

12. The hot water energy storage system according to claim 11 in which water is returned to the storage vessel via a feed pipe, and the feed pipe is located at or near the top of the storage vessel.

13. The hot water energy storage system according to claim 11 in which the system is reversible such that the system can operate as a heating system or as a cooling system.

14. The hot water energy storage system according to claim 13 in which the direction in which water is pumped is reversed to allow the system to be reversed.

15. The hot water energy storage system according to claim 11 in which the diverting valve is arranged such that the diverted water is combined with the water newly taken from the storage vessel before entering the pump.

16. The hot water energy storage system according to claim 11 having a second diverting valve arranged, in use, to direct a proportion of the water from the pump outlet back to the pump inlet, without passing through the heat exchanger or re-entering the storage vessel.

* * * * *